Jan. 27, 1970  E. C. HENRIKSEN  3,491,609
VARIABLE SPEED DRIVE MECHANISM
Filed July 12, 1968
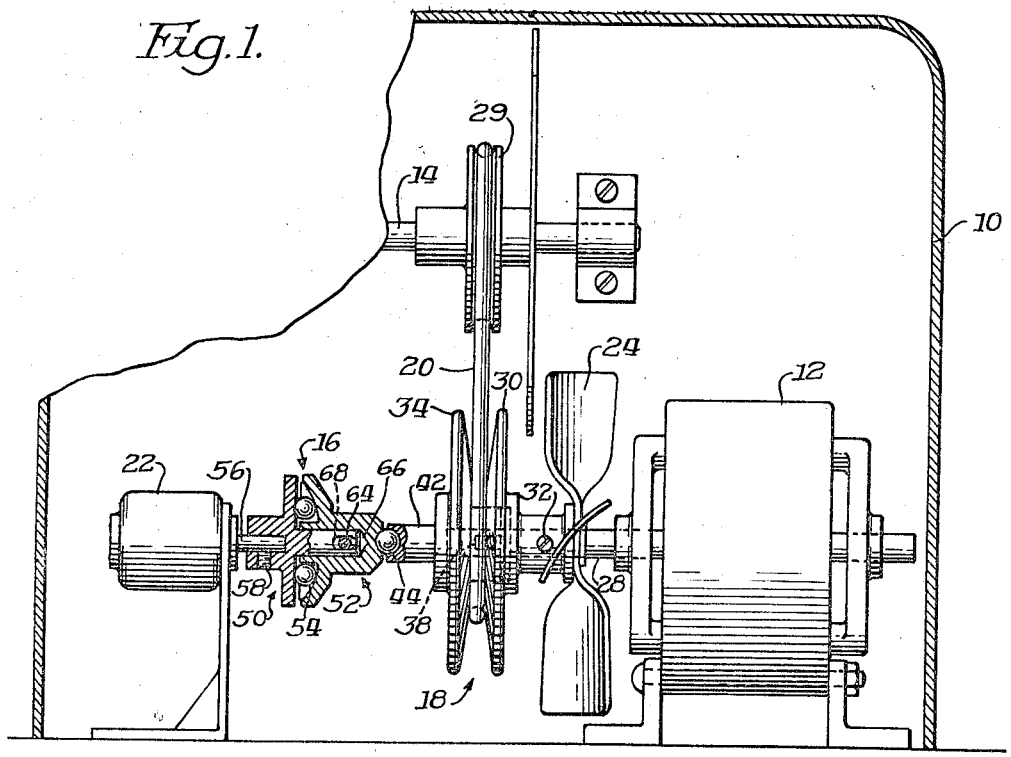
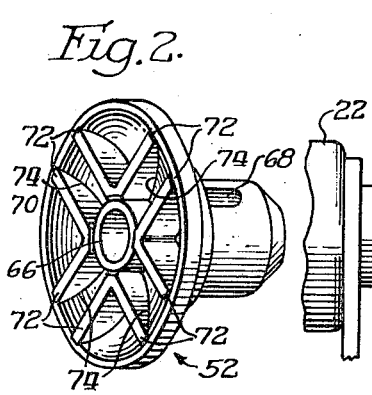
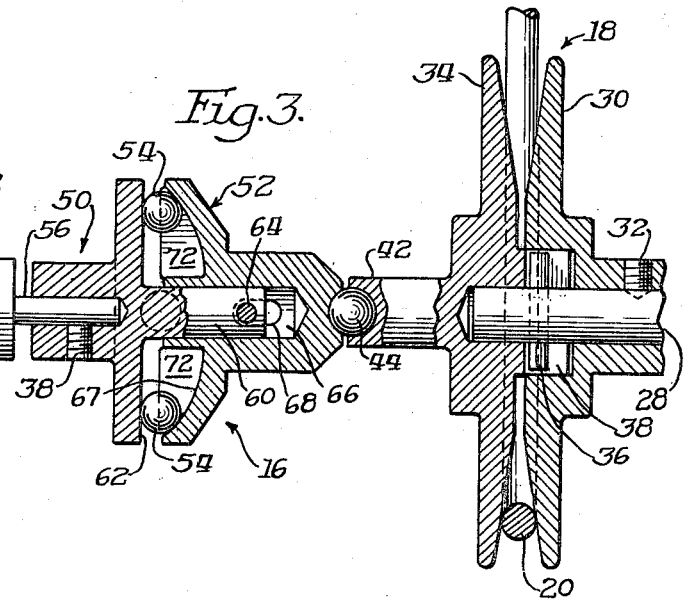
Inventor:
Elmer C. Henriksen.
Finnegan, Henderson & Farabow
Attys ed States Patent Office 3,491,609
Patented Jan. 27, 1970

3,491,609
VARIABLE SPEED DRIVE MECHANISM
Elmer C. Henriksen, Chicago, Ill., assignor to Bell & Howell Company, Chicago, Ill., a corporation of Illinois
Filed July 12, 1968, Ser. No. 744,355
Int. Cl. F16h 55/52
U.S. Cl. 74—230.17                        11 Claims

ABSTRACT OF THE DISCLOSURE

A motion picture projector drive assembly is provided that possesses a speed regulation capability. A constant speed motor, acting through an adjustable sheave pulley and a belt, is connected to drive the main cam shaft of a projector. A variable speed motor is connected to drive a centrifugally-activated regulator that produces a thrust, which varies with the rotational speed of the regulator and changes the effective diameter of the adjustable sheave pulley. Thus the linear speed of the belt and the speed of the projector cam shaft can be varied in accordance with changes in the speed of the variable speed motor which can be controlled by an electrical signal. The speed regulator includes a base member, a thrust member mounted for limited axial movement relative to the base member, and centrifugally-activated means positioned between the base member and the thrust member for exerting an amount of thrust on the axially-movable thrust member that varies with the speed of rotation of the regulator.

---

This invention relates to variable speed drive mechanisms, and more particularly to variable speed drive mechanisms capable of incremental changes in output speed for driving motion picture projectors and the like.

Shaded pole electric motors possess many desirable characteristics for driving motion picture projectors, and are widely used in this capacity. These motors provide adequate power for driving projectors and operate at acceptably low noise levels. Also, they are self-starting and relatively inexpensive to manufacture.

Because of their desirable operating characteristics, shaded pole motors fulfill most of the design criteria for use in a motion picture projector drive system designed to be synchronized with another apparatus, such as another projector or a tape recorder, by an electrical signal. However, it is difficult to vary the speed of these motors by direct electrical means.

The present invention permits control by an electrical signal of the output speed of a drive mechanism powered by a constant speed electric motor and in particular permits the use of a shaded pole motor for driving a motion picture projector in applications where the film speed must be varied as where the film speed is synchronized with another operation.

Remote manual speed control of a machine is also possible using the drive mechanism of the invention. For example, a manually operated control mechanism at a remote location may be used to produce or regulate an electrical control signal that is fed to the drive mechanism. Variations in the control signal can be translated to variations in the output speed of the drive mechanism.

The invention provides a speed control system that uses a minimum number of simply constructed elements cooperating in a positive, essentially maintenance-free manner. Also, the speed control system is compact and operates without generating objectionably loud noises.

The invention includes a variable speed drive mechanism powered by a constant speed electric motor comprising a centrifugally-activated regulator for producing a thrust that is proportional to its rotational speed; a variable-speed motor connected to the regulator for rotating the regulator at varying controlled speeds; and an adjustable sheave pulley having an endless output drive means trained thereon, with the pulley mounted on a shaft driven by the constant speed motor, and including an axially-fixed disc and an axially-movable disc, the movable disc being connected to the regulator to permit thrust produced by the regulator to vary the effective diameter of the pulley and to permit the adjustment of the linear speed of the endless output drive means.

The invention also includes a variable speed, motion picture projector drive mechanism comprising a constant speed electric motor; a centrifugally-activated regulator for producing a linear thrust that is proportional to the rotational speed of the regulator, the regulator including a base member and a thrust meember that are mounted for rotation on a shaft with the thrust member mounted for limited axial movement relative to the base member, the adjacent faces of the members forming at least one race, and centrifugally-activated means positioned in the race for exerting a variable amount of thrust on the thrust member; a variable speed electric motor connected to the shaft on which the regulator is mounted for rotating the regulator at varying controlled speeds; and an adjustable sheave pulley having an endless output drive means trained thereon and connected to the drive shaft of the projector, the pulley mounted on a shaft driven by the constant speed motor and including an axially-fixed disc and an axially-movable disc with the movable disc being connected to the regulator to permit the thrust produced by the regulator to vary the effective diameter of the pulley and to permit adjusting the linear speed of the endless drive means.

Reference will now be made in detail to the present preferred embodiment of this invention, an example of which is illustrated in the accompanying drawings.

The accompanying drawings, which are incorporated in and constitute a part of this specification, illustrate one embodiment of the invention, and together with the description, serve to explain the principles of the invention.

Of the drawings:

FIG. 1 is a side elevation, partly in section, of the control system of this invention and illustrates the relationship of the elements when the speed control motor is rotating at a low speed;

FIG. 2 is a perspective view of the thrust member of the centrifugal speed regulator of this invention; and FIG. 3 is a side elevation, partly in section, of portions of the apparatus illustrated in FIG. 1 showing the elements in the position which they assume when the speed control motor is rotating at a high speed.

It is to be understood that both the foregoing general description and the following detailed description are exemplary and explanatory but are not restrictive of the invention.

In FIG. 1, a portion of the housing 10 of a motion picture projector is illustrated supporting the elements of the invention. A constant speed electrical motor 12 is provided to supply the power to drive the main cam shaft 14 of the projector. Control of the r.p.m. of cam shaft 14 is effected by a centrifugally-activated speed regulator, generally 16, which positions a movable disc of an adjustable sheave pulley, generally 18, and controls the effective diameter of pulley 18. Since changing the effective diameter of pulley 18 changes the linear speed of the output drive means, here illustrated as endless belt 20, the r.p.m. of cam shaft 14 can be varied by varying the speed of rotation of regulator 18. A variable speed motor 22 having a controlled output speed is provided for driving centrifugal speed regulator 16.

Preferably, for driving a motion picture projector, motor 12 is a shaded pole signal phase induction motor.

However, it will be obvious to one skilled in the art that the variable speed drive mechanism of the invention is useful in varying the output drive from any motor, and may be used to drive a variety of machines in addition to motion picture propectors.

A blower 24 and adjustable sheave pulley 18 are mounted on the output shaft 28 of motor 12. Adjustable sheave pulley 18 transmits power from shaft 28 to projector cam shaft 14 through endless belt 20 and pulley 29 on cam shaft 14.

One disc 30 of pulley 18 is fixed on shaft 28 by set screw 32 to prevent axial or rotational movement of disc 30 relative to shaft 28. The other disc, disc 34 of pulley 18, is slip fit on shaft 28 to permit a sliding axial movement of disc 34 relative to shaft 28. A pin 36, best seen in FIG. 3, extends through shaft 28 and is seated in an axially-extending slot 38 of disc 34 to insure that disc 34 rotates at the same speed as shaft 28. However, disc 34 is capable of limited axial movement along shaft 28 because pin 26 can slide axially in slot 38.

The adjacent faces of discs 30 and 34 form a V-shaped groove. The effective diameter of pulley 18 can be varied by moving disc 34 relative to disc 30 along the axis of rotation of the pulley. For example, when disc 34 is moved towards disc 30, belt 20 is forced radially out from the axis of shaft 28 and the effective diameter of the pulley is increased. Conversely, as disc 34 is moved away from disc 30, belt 20 is permitted to slide radially inwardly of the axis of shaft 28 and the effective diameter of the pulley is decreased.

Disc 34 includes an integral rod portion 42 that is axially aligned with shaft 28 and terminates in a thrust bearing 44. Thrust bearing 44 abuts speed regulator 16 and permits transfer of thrust from the speed regulator, which rotates at varying speeds, to disc 34, which rotates at the constant speed of output shaft 28, without creating large frictional forces.

Belt 20 forms a preferred form of output drive means. When made of an elastic material, the belt is capable of stretching to increase its effective length when the diameter of pulley 18 is increased. Also, tension on an elastic belt is sufficient, in the absence of thrust exerted on disc 34 by regulator 16, to move disc 34 of pulley 18 away from disc 30 and reduce the effective diameter of the pulley.

In accordance with the invention, a speed regulator is provided that produces a thrust that varies with the rotational speed at which the regulator is driven. As here embodied, speed regulator 16 includes a base member generally 50, a thrust member, generally 52, and centrifugally-activated means, such as spherical bills 54, for exerting a thrust on member 52 that a proportional to the rotation speed of the regulator.

Base member 50 is fixed on shaft 56 of variable speed motor 22 by set screw 58. Thus, base member 50 rotatees at the speed of shaft 56 and is axially-fixed thereon.

An integral shaft 60 projects from a face 62 of base member 50 that is positioned adjacent thrust member 52. A pin 64 mounted in thrust member 52 restricts the movement of thrust member 52 relative to base member 50 as described in detail below.

Thrust member, generally 52, includes a central hollow shaft 66 extending longitudinally from face 67 which is positioned adjacent face 62. Hollow shaft 66 permits the thrust member to be concentrically mounted on shaft 60. A longitudinally-extending slot 68 is provided to receive pin 64 and cooperate with the pin in limiting longitudinal movement of thrust member 52 relative to base member 50.

The adjacent faces 62 and 67 of base member 50 and thrust member 52, respectively, form at least one race having a depth that varies with its distance from the axis of rotation of the speed regulator.

As best seen in FIG. 2, face 67 of the thrust member forms a generally concave surface with respect to face 62 of the base member. A central collar 70 and four pairs of spaced webs 72, extending transversely from the collar 70, are provided to form four grooves 74. Grooves 74 cooperate with face 62 to form four substantially identical races which each have a variable depth. The depth of each race, as the term is used in the specification and claims, refers to the dimension of the race extending in an axial direction with respect to the axis of rotation of the regulator.

It should be noted that the depth of the groove 74 and hence the depth of each of the races formed thereby varies inversely with the distance from the axis of rotation of the speed regulator. Also, as can be seen by comparing FIGS. 1 and 3, the depth of each entire race increases as thrust member 52 is moved away from base member 50.

Centrifugally-activated means, such as spherical balls 54, are positioned in each of the races formed by the adjacent faces 62 and 67 of the base member and the thrust member. Balls 54 move progressively outwardly from collar 70 as the speed of rotation of motor 22 increases. Thus, balls 54 exert a thrust on the thrust member that varies with the speed of rotation of regulator 16 because of the configuration of the races in which the depth decreases with increasing radial distance from the axis of rotation. Balls 54 are capable of moving thrust member 52 axially away from base member 50 as the speed of rotation of the regulator is increased and centrifugal force tends to move the balls outward and to force face 67 away from face 62.

As here embodied, one spherical ball 54 is positioned in each of the four races defined by grooves 74 and face 62. Each ball 54 has a diameter which exceeds the depth of the outer radial portions of the race when the regulator is stationary or rotated at a relatively low speed as shown in FIG. 1 so that when centrifugal force urges the balls 54 outwardly, thrust member 52 is moved axially away from base member 50 to accommodate the diameter of the balls.

As illustrated in FIG. 1, variable speed motor 22 can have its output shaft 56 coaxially aligned with output shaft 28 of constant speed motor 12. Preferably, these shafts rotate in the same direction with respect to their common axis to minimize the friction on thrust bearing 44.

It will be realized by those skilled in the art that the invention is useful in numerous applications where variation of the output speed of a rotary machine is required. For example, the present drive mechanism can be synchronized with another apparatus by an electrical signal, or can be remotely controlled by manually varying an electrical control signal and transmitting this control signal to the variable speed motor.

In the utilization of the invention for driving a motion picture projector, speed control motor 22 is preferably a small permanent magnet direct current motor which has an output speed directly proportional to the voltage applied to it. A varying voltage signal acting through such a motor will permit regulation of the speed of a projector. In the following description of the operation of the apparatus, the use of a varying voltage signal and a permanent magnet direct curent motor is assumed. However, it will be apparent to one skilled in the art that other types of variable speed motors and other control means for such motors can also be used. In operation, constant speed motor 12 drives blower 24 and adjustable sheave pulley 18 at a constant speed. Speed regulator 16, by adjusting the effective diameter of pulley 18 controls the linear speed of belt 20 and therefore the speed of main cam shaft 14. A control means, such as electrical voltage signal, can act on speed control motor 22 to vary the speed of this motor which in turn varies the speed of regulator 16. When the speed of regulator 16 is varied, the amount of thrust exerted by regulator 16 on movable disc 34 of pulley 18 is varied, which in turn varies the effective diameter of pulley 18, and hence the linear speed of belt 20 and the speed of main cam shaft 14 of the projector.

FIG. 1 illustrates the position of the elements when motor 22 is receiving a low voltage signal and motor 22 is rotating at a low speed. The tension on belt 20, or an auxiliary means such as a spring, has moved disc 34 away from disc 30 to provide a relatively small effective diameter on pulley 18. Disc 34 in turn has forced thrust member 52 towards base member 50 and reduced the depth of the races formed by the adjacent faces 62 and 67 of these members. Balls 54 are positioned in the inner radial portion of the races and do not possess sufficient energy to move outward in the races. Pin 64 which limits axial movement of thrust member 52 rests at the end of slot 68 that is adjacent pulley 18.

An increase in the voltage signal to motor 22 speeds up the motor and increases the centrifugal forces acting on balls 54. Thus, balls 54 tend to move outwardly in the races to the position shown in FIG. 3. As balls 54 move outwardly, they force thrust member 52 away from base member 50 and an increased thrust is transmitted through thrust member 52 to disc 34.

The configuration of the races when at rest or at a low rotational speed, and particularly the relation of race depth to distance from the axis of revolution determines the amount of thrust generated at varying rotational speeds. More specifically, the degree of inclination of faces 62 and 67 that form the races affects the amount of thrust generated by the regulator. If the faces are inclined at a sharp angle, small changes in r.p.m. will produce a large change in the amount of thrust. On the other hand, if the faces approach a parallel configuration, only a small change in thrust will be produced by significant changes in the r.p.m. of the regulator.

FIG. 3 illustrates the position of the elements when motor 22 is receiving a relatively high voltage signal. Each ball 54 has moved to the outer portion of its race and the balls have forced thrust member 52 and disc 34 towards disc 30. Belt 20 has been forced radially outwardly in the groove of pulley 18 by the movement of disc 34 towards disc 30. Thus, the effective diameter of pulley 18, as illustrated in FIG. 3, is greater than the effective diameter of pulley 18 as illustrated in FIG. 1. Consequently, belt 20 and cam shaft 14 are driven at a high speed.

When thrust member 52 moves axially away from base member 50 due to the increased centrifugal force acting on balls 54, slot 68 in the thrust member slides along pin 64 until the pin is positioned against the end of the slot as shown in FIG. 3. The configuration of the width of the races of regulator 16 and the configuration of the adjacent faces of the discs forming the sheave of pulley 18 can be designed to make the speed of belt 20 and cam shaft 14 proportional to the value of the electrical signal fed to motor 22. Incremental changes, even minute changes, in the value of the signal will thus result in corresponding changes in the output speed.

The time lag of the drive mechanism in responding to changes in the value of the electrical signal is small. This feature is important when it is desired to effectively synchronize the drive of the motion picture projector with another operation by an electrical signal.

The invention in its broader aspects is not limited to the specific details shown and described, but departures may be made from such details without departing from the principles of the invention and without sacrificing its chief advantages.

I claim:

1. A variable speed drive mechanism powered by a constant speed electric motor comprising:
    (a) a centrifugally-activated regulator for producing a thrust that is proportional to its rotational speed;
    (b) a variable speed motor connected to said regulator for rotating said regulator at varying controlled speeds; and
    (c) an adjustable sheave pulley having an endless output drive means trained thereon, said pulley mounted on a shaft driven by said constant speed motor, and including an axially-fixed disc and an axially-movable disc, said movable disc being connected to said regulator to permit thrust produced by said regulator to vary the effective diameter of said pulley and to permit adjusting the linear speed of said endless output drive means.

2. The mechanism of claim 1 wherein said regulator comprises a base member and a thrust member that are each mounted for rotation on a shaft driven by said variable speed motor with said thrust member mounted for limited axial movement relative to said base member; and centrifugally-activated means positioned between the adjacent faces of said members and responsive to the centrifugal force applied to said means, for exerting a thrust that varies with the speed of rotation of said regulator on said movably mounted thrust member.

3. The mechanism of claim 2 wherein said centrifugally-activated regulator is mounted on a shaft axially aligned with said adjustable sheave pulley, and said thrust member is connected to said movable disc by a thrust bearing.

4. The mechanism of claim 2 wherein the adjacent faces of said members form at least one race and a portion of one adjacent face that forms said race includes a surface that is concave with respect to the adjacent face of the other of said members.

5. The mechanism of claim 4 wherein said centrifugally-activated means comprises a plurality of spherical balls each having a diameter that exceeds the depth of the outer radial portion of said race when said regulator is rotated at a relatively low speed to permit said balls to exert a variable amount of thrust on said thrust member as said regulator is rotated at higher speeds and increasing centrifugal force moves said balls outward in said race.

6. A variable speed, motion picture projector drive mechanism comprising:
    (a) a constant speed electric motor;
    (b) a centrifugally-activated regulator for producing a linear thrust that is proportional to the rotational speed of the regulator, said regulator including a base member and a thrust member that are each mounted for rotation on a shaft with said thrust member mounted for limited axial movement relative to said base member, the adjacent faces of said members forming at least one race, and centrifugally-activated means positioned in said race for exerting a variable amount of thrust on said thrust member;
    (c) a variable speed electric motor connected to the shaft on which said regulator is mounted for rotating said regulator at varying controlled speeds; and
    (d) an adjustable sheave pulley having an endless output drive means trained thereon and connected to the drive shaft of the projector, said pulley mounted on a shaft driven by said constant speed motor and including an axially-fixed disc and an axially-movable disc with said movable disc being connected to said regulator to permit the thrust produced by said regulator to vary the effective diameter of said pulley and to permit adjusting the linear speed of said endless drive means.

7. The drive mechanism of claim 6 wherein said endless output drive means comprises a stretchable rubber belt having an effective length that varies with the effective diameter of said pulley.

8. The drive mechanism of claim 6 wherein said variable speed motor is a permanent magnet direct current motor and said constant speed electric motor is a shaded pole motor.

9. The drive mechanism of claim 6 wherein said centrifugally-activated regulator is mounted on a shaft axially aligned with said adjustable sheave pulley, and said thrust member is connected to said movable disc by a thrust bearing.

10. The drive mechanism of claim 6 wherein a portion of the face of one of said members is concave with respect to the adjacent face of the other of said members.

11. The drive mechanism of claim 10 wherein said members form a plurality of races, and said centrifugally-activated means comprises a plurality of spherical balls having a diameter that exceeds the depth of the outer radial portions of the race in which said balls are positioned when said regulator is rotated at a low speed to permit said balls to exert an increasing thrust that moves said thrust member and increases the width of said race as increasing centrifugal force moves said balls outward in said races.

References Cited
UNITED STATES PATENTS

| | | | |
|---|---|---|---|
| 2,325,649 | 8/1943 | Batterson | 74—230.17 |
| 2,731,849 | 1/1956 | Rockwood et al. | 74—230.17 |
| 2,911,838 | 11/1959 | McGrath. | |

FRED C. MATTERN, Jr., Primary Examiner

JAMES A. WONG, Assistant Examiner